(12) United States Patent
Muraki et al.

(10) Patent No.: US 7,923,132 B2
(45) Date of Patent: Apr. 12, 2011

(54) PHOTOSENSITIVE DIELECTRIC PASTE AND ELECTRONIC PART MADE WITH THE SAME

(75) Inventors: Reiko Muraki, Yasu (JP); Shuichi Towata, Moriyama (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 16 days.

(21) Appl. No.: 12/565,035

(22) Filed: Sep. 23, 2009

(65) Prior Publication Data

US 2010/0009838 A1    Jan. 14, 2010

Related U.S. Application Data

(63) Continuation of application No. PCT/JP2008/055062, filed on Mar. 19, 2008.

(30) Foreign Application Priority Data

Mar. 26, 2007  (JP) ................................ 2007-078641

(51) Int. Cl.
*B32B 15/08* (2006.01)
*G03G 15/00* (2006.01)
(52) U.S. Cl. ............... 428/702; 428/701; 430/2; 430/56
(58) Field of Classification Search .................. 428/701, 428/702; 430/2, 56, 322, 252, 281.1
See application file for complete search history.

(56) References Cited

U.S. PATENT DOCUMENTS

| | | | | |
|---|---|---|---|---|
| 6,183,669 | B1 * | 2/2001 | Kubota et al. | 156/89.16 |
| 6,346,564 | B1 * | 2/2002 | Kubota et al. | 524/403 |
| 2001/0033219 | A1 * | 10/2001 | Iha et al. | 336/90 |
| 2002/0076657 | A1 * | 6/2002 | Towata | 430/322 |
| 2002/0106577 | A1 * | 8/2002 | Kubota | 430/252 |
| 2003/0143486 | A1 * | 7/2003 | Kubota et al. | 430/281.1 |

FOREIGN PATENT DOCUMENTS

| | | |
|---|---|---|
| JP | 6-251621 A | 9/1994 |
| JP | 2000-30534 | 1/2000 |
| JP | 2000-222940 A | 8/2000 |

* cited by examiner

*Primary Examiner* — Jennifer C McNeil
*Assistant Examiner* — Lauren Robinson
(74) *Attorney, Agent, or Firm* — Dickstein Shapiro LLP

(57) ABSTRACT

Provided is a photosensitive dielectric paste capable of being burned at a low temperature in a short time and forming a dielectric film (insulator film) having favorable properties, such as sintering properties or temperature characteristics of dielectric constant, and an electronic part having favorable properties having a dielectric film formed using the same. The photosensitive dielectric paste of the invention contains (a) an inorganic ingredient containing 10 to 30% by volume of dielectric powder containing a Ba—Nd—Ti complex oxide powder, 50 to 80% by volume of supporting glass powder, and 1 to 20% by volume of sintering aid glass powder containing Bi in a proportion of 50 to 90% by weight in terms of $Bi_2O_3$; and (b) a photosensitive organic ingredient, in which the Ba—Nd—Ti complex oxide powder reacts with the sintering aid glass powder upon burning to thereby produce a Bi—Nd—Ti complex oxide. As the supporting glass powder, a glass powder containing Si in a proportion of 70 to 90% by weight in terms of $SiO_2$ is used.

19 Claims, 2 Drawing Sheets

PHOTOSENSITIVE DIELECTRIC PASTE AND ELECTRONIC PART MADE WITH THE SAME

This is a continuation of application Serial No. PCT/JP2008/055062, filed Mar. 19, 2008, the contents of which are incorporated herein by reference.

TECHNICAL FIELD

The present invention relates to a photosensitive dielectric paste and electronic parts having a dielectric film formed using the same.

BACKGROUND ART

Heretofore, a photosensitive ceramic composition has been proposed as a photosensitive ceramic composition for use in a laminated ceramic capacitor, for example, which contains (a) ceramic powder (e.g., alumina, titanate, zirconate, stannate, $BaTiO_3$, $CaTiO_3$, $SrTiO_3$, $PbTiO_3$, $CaZrO_3$, $BaZrO_3$, $CaSnO_3$, $BaSnO_3$, and $Al_2O_3$), (b) an inorganic binding aid (having a glass transition temperature of 550 to 825° C., particularly preferably 575 to 750° C.), (c) a polymer (e.g., alkyl acrylate, alkyl methacrylate, ethylene unsaturated carboxylic acid, an amine or silane-containing compound), (d) a photopolymerization initiator, (e) a photocurable monomer, and (f) an organic medium (Patent Document 1).

The use of the photosensitive ceramic composition of Patent Document 1 allows fine processing by photolithography and formation of a film of a dense pattern.

However, an insulating layer having a high dielectric constant can be formed when $BaTiO_3$ or the like is used as ceramic powder in a dielectric material in the case of the photosensitive ceramic composition disclosed in Patent Document 1. Also, temperature characteristics of dielectric constant are not disclosed. Thus, under the actual circumstances, the photosensitive ceramic composition disclosed in Patent Document 1 cannot be sufficiently used in an application requiring that the temperature characteristics of dielectric constant are favorable.

A porcelain dielectric material for temperature compensation has been proposed as a porcelain dielectric material for temperature compensation considering temperature characteristics of dielectric constant, which contains (a) a composition containing 2.5 to 17.5 mol % of BaO, 50.0 to 75.0 mol % of $TiO_2$, and 15.0 to 47.5 mol % of $Nd_2O_3$ (excluding 10.0 to 12.5 mol % of BaO, 50.0 to 55.0 mol % of $TiO_2$, 12.5 to 15.0 mol % of BaO, 50.0 to 57.5 mol % of $TiO_2$, 15.0 to 17.5 mol % of BaO, 50.0 to 60.0 mol % of $TiO_2$], and (b) 7.4 to 20.0% of $Bi_2O_3$ (Patent Document 2).

When the porcelain dielectric material for temperature compensation is used, a sintered compact having favorable temperature characteristics of dielectric constant can be obtained. However, the porcelain dielectric material for temperature compensation is not a photosensitive material. Therefore, there arises a problem in that it is hard to perform fine processing, which can be performed by photolithography of a photosensitive paste. Moreover, there also arises a problem in that since a glass ingredient is not present and the sintering temperature is as high as 1000° C. or more (1270 to 1400° C.), the equipment and energy costs in a burning process are high.

[Patent Document 1] Japanese Patent No. 1660875 (Japanese Examined Patent Application Publication No. 3-23514)
[Patent Document 2] Japanese Unexamined Patent Application Publication No. 49-120200

DISCLOSURE OF INVENTION

Problems to be Solved by the Invention

It is an object of the present invention to solve the above-described problems and to provide a photosensitive dielectric paste capable of being burned (sintered) at a low temperature in a short time and forming a dielectric film (insulator film) having favorable properties, such as sintering properties or temperature characteristics of dielectric constant, and to electronic parts having a dielectric film formed using the same.

Means for Solving the Problems

In order to solve the above-described problems, a photosensitive dielectric paste of the invention contains:

(a) an inorganic ingredient containing 10 to 30% by volume of dielectric powder containing a Ba—Nd—Ti complex oxide powder, 50 to 80% by volume of supporting glass powder, and 1 to 20% by volume of sintering aid glass powder containing Bi; and (b) a photosensitive organic ingredient, in which the Ba—Nd—Ti complex oxide powder reacts with the sintering aid glass powder upon burning to thereby produce a Bi—Nd—Ti complex oxide.

A photosensitive dielectric paste of the invention contains:

(a) an inorganic ingredient-containing dielectric powder containing a Ba—Nd—Ti complex oxide powder and at least one inorganic powder selected from quartz, alumina, mullite, and zirconia in a total proportion of 10 to 30% by volume, 50 to 80% by volume of supporting glass powder, and 1 to 20% by volume of sintering aid glass powder containing Bi; and (b) a photosensitive organic ingredient, in which the inorganic powder is contained in a proportion of 50% by volume or lower based on the total proportion of the dielectric powder, and the Ba—Nd—Ti complex oxide powder reacts with the sintering aid glass powder upon burning to thereby produce a Bi—Nd—Ti complex oxide.

In the photosensitive dielectric paste of the invention, the sintering aid glass powder is glass powder containing 50 to 90% of Bi calculated in terms of $Bi_2O_3$.

In the photosensitive dielectric paste of the invention, the supporting glass powder contains Si in a proportion of 70 to 90% by weight calculated in terms of $SiO_2$.

An electronic part of the invention has a dielectric film obtained by sintering the photosensitive dielectric paste of the invention.

ADVANTAGES

The photosensitive dielectric paste of the invention contains (a) an inorganic ingredient containing 10 to 30% by volume of dielectric powder containing a Ba—Nd—Ti complex oxide powder, 50 to 80% by volume of supporting glass powder, and 1 to 20% by volume of sintering aid glass powder containing Bi and (b) a photosensitive organic ingredient, and the Ba—Nd—Ti complex oxide powder reacts with the sintering aid glass powder upon burning to thereby produce a Bi—Nd—Ti complex oxide. Thus, a fine and highly precise pattern can be formed by optical techniques, such as photolithography, and moreover, a dielectric film (insulator film) containing a dielectric material having a high dielectric constant and excellent temperature characteristics can be obtained by burning at a low temperature in a short time.

The photosensitive dielectric paste of the invention contains (a) an inorganic ingredient containing dielectric powder containing a Ba—Nd—Ti complex oxide powder and at least one inorganic powder selected from quartz, alumina, mullite, and zirconia in a total proportion of 10 to 30% by volume, 50 to 80% by volume of supporting glass powder, and 1 to 20% by volume of sintering aid glass powder containing Bi and (b) a photosensitive organic ingredient, in which the inorganic powder is present in a proportion of 50% by volume or lower based on the total proportion of the dielectric powder and the inorganic powder. Thus, a finer and highly precise pattern can be formed by optical techniques, such as photolithography, and moreover a dielectric film (insulator film) having a high dielectric constant, excellent temperature characteristics, and a high dielectric breakdown voltage can be obtained by sintering at a low temperature in a short time as described above.

More specifically, the film strength can be further increased, and a higher reliable film as a dielectric film (insulator film) can be obtained by partially replacing the dielectric powder with at least one inorganic powder selected from quartz, alumina, mullite, zirconia, and the like in a proportion of 50% by volume or lower. Particularly, the dielectric breakdown voltage of a dielectric film can be increased.

Among the above inorganic powders, it is most preferable to use quartz. However, when powders of alumina, mullite, and zirconia having the same properties as those of quartz are used, the same effects as those obtained in the case where quartz is used are obtained.

When the proportion of an ingredient, such as quartz, that does not react with the sintering aid glass increases, sintering properties deteriorate, and when the dielectric powder is partially replaced in a proportion of more than 50% by volume, a dense film cannot be obtained. Therefore, the substitution proportion by inorganic powder, such as quartz, alumina, mullite, zirconia, or the like, is preferably adjusted to 50% by volume or lower.

Moreover, due to softening of the sintering aid glass, wet-spread in ceramic powder, and the generation of a Bi—Nd—Ti complex oxide (e.g., $(Bi, Nd)_4Ti_3O_{12}$) at the glass-dielectric material interface, the temperature characteristics can be increased and moreover sufficient space development inhibitory effects can be obtained, which allows the formation of a dense dielectric film.

The composition of the sintering aid glass powder is not limited insofar as a Bi ingredient is present. However, it is particularly preferable to use glass powder containing Bi in a proportion of 50 to 90% by weight in terms of $Bi_2O_3$.

When Bi in the sintering aid glass powder exceeds 90% by weight in terms of $Bi_2O_3$, the glass softening point becomes excessively low, the glass is softened at a degreasing temperature, and the degreasing properties decrease, sometimes making it difficult to obtain a sufficiently dense dielectric film. When Bi in the glass powder becomes lower than 50% by weight in terms of $Bi_2O_3$, the softening point of glass powder becomes high, and the function as a sintering aid becomes weak, sometimes making it impossible to obtain a sufficient sintering level.

The reason why it is preferable that the proportion of the dielectric powder in the inorganic ingredient be adjusted to 10 to 30% by volume in the photosensitive dielectric paste of the invention resides in that when the proportion of the dielectric powder becomes lower than 10% by volume, excess sintering occurs due to lack of the dielectric powder and when the proportion thereof exceeds 30% by volume, the proportion of the dielectric powder becomes too high, resulting in insufficient sintering.

The reason why it is preferable that the proportion of the supporting glass powder be adjusted to 50 to 80% by volume resides in that when the proportion thereof becomes lower than 50% by volume, the supporting function of the supporting glass powder becomes insufficient, making it impossible to maintain the shape of a dielectric film and when the proportion thereof exceeds 80% by volume, excess sintering occurs.

The reason why it is preferable that the proportion of the sintering aid glass powder containing Bi be adjusted to 1 to 20% by volume resides in that when the proportion becomes lower than 1% by volume, the function as a sintering agent cannot be sufficiently developed, and thus the sintering is likely to be insufficient, and when the proportion thereof exceeds 20% by volume, viscous flow at the maximum burning temperature becomes high, making it impossible to maintain a given via hole shape when the via hole is formed in the dielectric film, which is not preferable.

The photosensitive dielectric paste of the invention contains two kinds of glasses, i.e., supporting glass and sintering aid glass, as described above. The supporting glass serves as a main ingredient of the glass ingredient and performs the function of securing the strength after burning (supporting function). In contrast, the softening point of the sintering aid glass is lower than that of the supporting glass, and performs the function of improving wettability with the dielectric powder or the inorganic powder. The sintering aid glass is also glass that performs the function of generating a Bi—Nd—Ti complex oxide through a reaction with a Bi—Nd—Ti complex oxide powder.

By the use of the photosensitive dielectric paste of the invention containing the supporting glass and the sintering aid glass that perform the above functions in combination, a dielectric film (insulator film) having high properties that is excellent in sintering properties and excellent in a dielectric constant or temperature characteristics of dielectric constant can be more surely produced.

By the use of glass containing Si in a proportion of 70 to 90% by weight in terms of $SiO_2$ as the supporting glass, a glass capable of forming a film having less viscous flow and a high supporting function is easily obtained. This makes it possible to obtain a dielectric film (insulator film) having a high supporting function and in which resists diffusion of a conductive paste ingredient used in such a manner as to be in contact with the photosensitive dielectric paste of the invention.

An electronic part of the invention contains a dielectric film (insulator film) obtained by sintering the photosensitivity dielectric paste of the invention. Since the dielectric film has a high dielectric constant and excellent temperature characteristics, electronic parts that are smaller and have less degradation of properties due to temperature changes than former electronic parts can be obtained.

BRIEF DESCRIPTION OF DRAWINGS

FIG. 1A is a perspective view illustrating the structure of the filter element and FIG. 1B is a perspective view illustrating the state as viewed from the rear side.

Figure 1A:
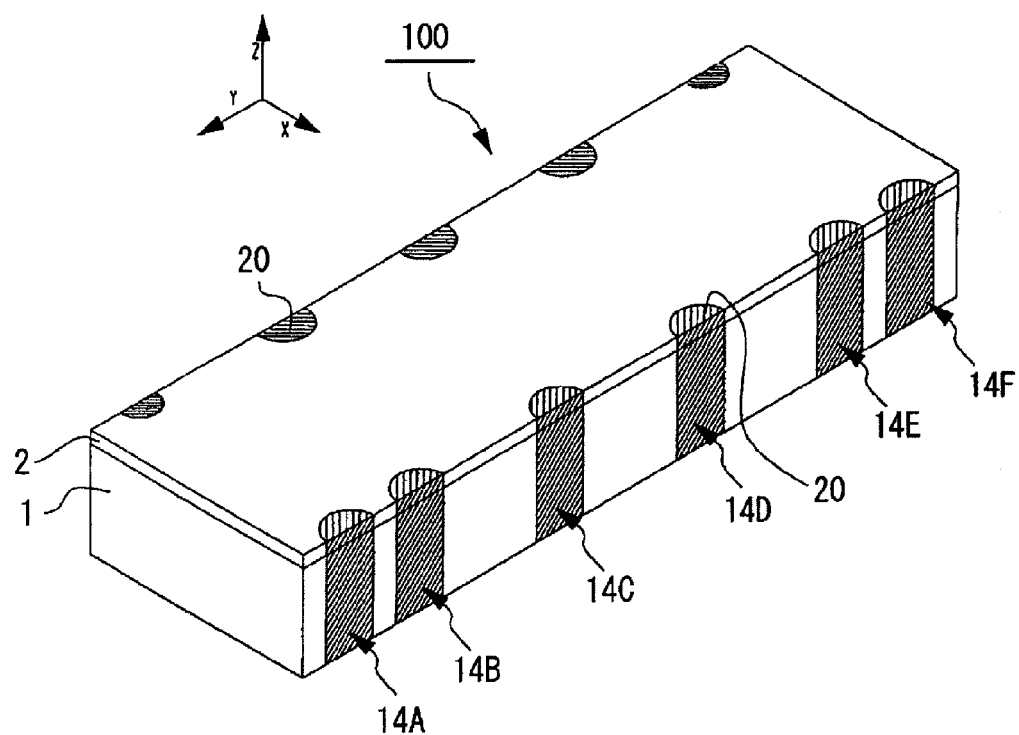
FIGS. 1A and 1B are views illustrating a filter element having a dielectric film (insulator film) formed using the photosensitive dielectric paste of the invention.

REFERENCE NUMERALS 1 dielectric substrate
2 dielectric film (insulator film)
12A to 12I main surface resonant line
13 ground electrode
14A to 14F, 15B, 15C, 15D side resonant line
20 electrode
100 filter element

BEST MODES FOR CARRYING OUT THE INVENTION

In a photosensitive dielectric paste of the invention, a Ba—Nd—Ti complex oxide is used as dielectric powder. The dielectric powder may contain powders other than the Ba—Nd—Ti complex oxide.

As a glass material, two kinds of glasses, i.e., supporting glass powder and sintering aid glass powder, are used.

The supporting glass powder is glass that is a main ingredient of the glass materials and performs the function of securing the strength after burning (supporting function). It is preferable that the supporting glass powder have less viscous flow at the time of sintering and suppress diffusion, of an ingredient constituting a conductive paste used in such a manner as to be in contact with the photosensitive dielectric paste of the invention (e.g., a conductive paste used for forming a conductor on the dielectric layer formed using the photosensitive dielectric paste of the invention) in a dielectric layer formed using the photosensitive dielectric paste of the invention.

The sintering aid glass powder is glass whose softening point is lower than that of the supporting glass powder and improves wettability of the ceramic powder.

When the photosensitive dielectric paste of the invention is burned, the sintering aid glass powder is softened first, and then sintering at a low temperature is achieved, and moreover, the sintering aid glass wet-spreads in ceramic powder to thereby suppress the development of pores.

With the space (pore) generation inhibitory effects obtained by the generation of a Bi—Nd—Ti complex oxide (e.g., $(Bi, Nd)_4Ti_3O_{12}$) at the glass-dielectric material interface, burning at a low temperature in a short time and sintering at a low temperature (about 800 to 900° C.) can be more surely achieved and, moreover, a dense dielectric film without pores can be formed.

As the sintering aid glass powder, glass powder containing glass containing Bi is used. Examples of the glass containing Bi include a $Bi_2O_3$—$B_2O_3$—$SiO_2$ glass, a $Bi_2O_3$—$B_2O_3$—ZnO glass, and a $Bi_2O_3$—$B_2O_3$, and any of these glasses can be used. As the sintering aid glass powder, it is preferable to use glass powder containing Bi in a proportion of 50 to 90% by weight in terms of $Bi_2O_3$, as described above.

As the supporting glass powder, it is preferable to use glass whose softening point is lower by about 30 to 70° C. than the maximum burning temperature. As the sintering aid glass powder, it is preferable to use a glass whose softening point is lower by about 100 to 400° C. than the maximum burning temperature.

For example, when burned at a maximum burning temperature of about 800 to 900° C., the softening point of each of the supporting glass and the sintering aid glass is preferably in the following range:

Softening point range of supporting glass: 730 to 870° C.
Softening point range of sintering aid glass: 400 to 800° C.

As the supporting glass powder, it is preferable to use a low alkali borosilicate glass. In particular, glass containing Si in a proportion of 70 to 90% by weight in terms of $SiO_2$ has less viscous flow and exhibits a high supporting function, and thus the glass is preferable. Glass containing Si in a proportion of 70 to 90% by weight in terms of $SiO_2$ is preferably used as the supporting glass powder because it has a property of preventing diffusion of a conductive paste.

When the supporting glass powder is burned at too low a burning temperature in consideration of the fact that a temperature (sintering temperature) suitable for burning of the supporting glass powder is low, for example, the simultaneous sintering of a conductive paste (e.g., Ag paste) to be formed on a ceramic layer does not sufficiently progress. In contrast, when the temperature (sintering temperature) suitable for burning of the supporting glass powder burning is excessively high, the burning is performed at a high temperature. Therefore, a substance constituting the conductive paste is likely to diffuse in the ceramic layer. Therefore, as the supporting glass, glass that can be sintered at about 800 to 900° C. is preferable.

When the photosensitive dielectric paste film of the invention is burned, a Ba—Nd—Ti complex oxide reacts with the Bi glass during burning. Thus, a Ba—Nd—Ti complex oxide (for example, $(Bi, Nd)_4Ti_3O_{12}$), which exhibits the function of increasing temperature characteristics and the function of space generation inhibitory effects at the interface therebetween. As a result, the formation of a dielectric film (insulator film) that is a dense glass film having favorable temperature characteristics and having no pores can be achieved.

Since the $(Bi, Nd)_4Ti_3O_{12}$ can be generated in a temperature range of 600 to 700° C., the $(Bi, Nd)_4Ti_3O_{12}$ can be sufficiently generated at a low burning temperature of 800 to 900° C.

Similarly as in the photosensitive dielectric paste of the invention, when the Ba—Nd—Ti complex oxide powder reacts with the sintering aid glass, the wettability of the sintering aid glass and the Ba—Nd—Ti complex oxide powder improve and, moreover, at the Ba—Nd—Ti complex oxide powder-sintering aid glass interface, $(Bi, Nd)_4Ti_3O_{12}$ generates as described above, and a dense film having little or no pores is formed. Thus, mutual diffusion of each ingredient is accelerated, thereby forming a uniform film. As a result, a dielectric layer having small variations in properties can be formed. Specifically, a favorable and dense dielectric film having a dielectric breakdown voltage exceeding 0.3 kV/30 μm can be obtained.

When the Ba—Nd—Ti complex oxide powder (dielectric powder) does not react with the sintering aid glass, the wettability of the sintering aid glass and the dielectric powder becomes insufficient, and it is difficult to reduce pores in the interface between the sintering aid glass and the Ba—Nd—Ti complex oxide powder to a satisfactory level, making it impossible to obtain a dense dielectric film.

When the wettability of the sintering aid glass and the Ba—Nd—Ti complex oxide powder is not sufficient, mutual dispersibility of the sintering aid glass and the Ba—Nd—Ti complex oxide powder deteriorate, and the distribution becomes nonuniform, resulting in the fact that variations in properties also become large.

As the photosensitive organic ingredient, known organic photopolymerization or photo-denatured compounds can be used. Examples include (1) mixtures of monomers or oligomers having a reactive functional group, such as an unsaturated group, and optical radical generators, such as aromatic carbonyl compounds, (2) so-called diazo resins, such as a condensate of aromatic bisazide and formaldehyde, (3) mixtures of addition-polymerization compounds, such as epoxy compounds, and photoacid generators, such as diallyl iodonium salts, and (4) naphthoquinonediazide compounds.

Among the above, the mixtures of monomers or oligomers having a reactive functional group, such as an unsaturated group, and optical radical generators, such as aromatic carbonyl compounds, are particularly preferable.

Examples of monomers or oligomers having a reactive functional group include hexanediol triacrylate, tripropylene glycol triacrylate, trimethylol propane triacrylate, stearylacrylate, tetrahydrofurfuryl acrylate, lauryl acrylate, 2-phenoxyethyl acrylate, isodecyl acrylate, isooctyl acrylate, tridecyl acrylate, caprolactone acrylate, ethoxylated nonylphenol acrylate, 1,3-butanediol diacrylate, 1,4-butanediol diacrylate, 1,9-nonanediol diacrylate, diethylene glycol diacrylate, tetraethylene glycol diacrylate, triethylene glycol diacrylate, ethoxylated bisphenol A diacrylate, propoxylated neopentyl glycol diacrylate, tris(2-hydroxyethyl)isocyanurate triacrylate, ethoxylated trimethylol propane triacrylate, pentaerythritol triacrylate, propoxylated trimethylol propane triacrylate, propoxylated glyceryl triacrylate, pentaerythritol tetraacrylate, ditrimethylol propane tetraacrylate, dipentaerythritol hydroxy pentaacrylate, ethoxylated pentaerythritol tetraacrylate, tetrahydrofurfuryl methacrylate, cyclohexyl methacrylate, isodecyl methacrylate, lauryl methacrylate, triethylene glycol dimethacrylate, ethylene glycol dimethacrylate, tetraethylene glycol dimethacrylate, 1,4-butanediol dimethacrylate, diethylene glycol dimethacrylate, 1,6-hexanediol dimethacrylate, neopentylglycol dimethacrylate, 1,3-butylene glycol dimethacrylate, ethoxylated bisphenol A dimethacrylate, trimethylol propane trimethacrylate, isocyanuric acid EO-modified diacrylate, ethoxylated paracumyl phenol acrylate, ethylhexyl carbitol acrylate, N-vinyl-2-pyrrolidone, isobornyl acrylate, propylene glycol diacrylate, polyethylene glycol diacrylate, dipentaerythritol pentaacrylate, and dipentaerythritol hexaacrylate.

Examples of a photoradical generator include benzil benzoin ethyl ether, benzoin isobutyl ether, benzoin isopropyl ether, benzophenone, benzoyl benzoic acid, benzoyl benzoic acid methyl, 4-benzoyl-4'-methyldiphenyl sulfide, benzyl dimethyl ketal, 2-n-butoxy-4-dimethylamino benzoate, 2-chlorothioxanthone, 2,4-diethyl thioxanthone, 2,4-diisopropyl thioxanthone, isopropyl thioxanthone, 2-dimethylamino ethyl benzoate, p-dimethylamino ethyl benzoate, p-dimethylamino isoamyl benzoate, 3,3,-dimethyl-4-methoxybenzophenone, 2,4-dimethyl thioxanthone, 1-(4-dodecylphenyl)-2-hydroxy-2-methyl propane-1-one, 2,2-dimethoxy-1,2-diphenylethane-1-one, hydroxy cyclohexyl phenyl ketone, 2-methyl-2-methyl-1-phenylpropane-1-one, 1-[4-(2-hydroxyethoxy)-phenyl]-2-hydroxy-2-methyl-1-propan-1-one, 2-methyl-1-[4-(methylthio)phenyl]-2-morpholinoproane-1-one, methylbenzoyl formate, 1-phenyl-1,2-propanedione-2-(o-ethoxycarbonyl)oxime, 2-benzyl-2-dimethylamino-1-(4-morpholinophenyl)-1-butanone, bis(2,6-dimethoxybenzoyl)-2,4,4-trimethyl pentyl phosphine oxide, and phenyl bis(2,4,6-trimethyl benzoyl)phosphine oxide.

As the photosensitive organic ingredient, an acrylic copolymer having a carboxy group at the side chain can be used, for example. The acrylic copolymer can be produced by, for example, copolymerization of unsaturated carboxylic acid and an ethylenically unsaturated compound. Since the acrylic copolymer has a carboxyl group at the side chain, dissolution of an organic ingredient in a film after exposure to light in a developer is facilitated to increase development properties of the photosensitive dielectric paste, thereby forming finer via holes.

Examples of an unsaturated carboxylic acid include acrylic acid, methacrylic acid, maleic acid, fumaric acid, vinylacetic acid, and anhydrides thereof.

In contrast, examples of the ethylenically unsaturated compound include acrylate, such as methyl acrylate or ethyl acrylate, methacrylate, such as methyl methacrylate or ethyl methacrylate, and fumarate, such as monoethyl fumarate.

The photosensitive dielectric paste to which the photosensitive organic ingredient has been added can form fine holes for via holes by emitting active light, such as ultraviolet rays, electron beams, or X-rays, through a photomask (exposure to light), and dissolving unexposed portions with an alkaline developing solution, such as sodium carbonate (development). Then, via holes can be formed by charging the holes for via holes with a conductive material.

To the photosensitive dielectric paste, preservation stabilizers, such as polymerization inhibitors, antioxidants, dyes, pigments, defoaming agents, surfactants, or plasticizers, can be appropriately added as required.

EXAMPLE 1

Hereinafter, features of the invention will be described in more detail with reference to Examples of the invention.

Production of Photosensitive Dielectric Paste
(a) Dielectric Powder
  Ba—Nd—Ti complex oxide powder: $Ba(Sm, Nd)_2Ti_4O_{12}$
(b) Supporting Glass Powder
  Si—B—K glass: ($SiO_2$; 79% by weight, $B_2O_3$; 19% by weight, $K_2O$; 2% by weight), Glass softening point of 790° C.
(c) Sintering Aid Glass Powder
  Bi—B—Si glass: ($Bi_2O_3$; 74% by weight, $B_2O_3$; 22% by weight, $SiO_2$; 1% by weight, $Al_2O_3$; 3% by weight), Glass softening point of 490° C.
(d) Photosensitive Organic Ingredient (Photosensitive Varnish)

The above ingredients were mixed with proportions as indicated in Samples Nos. 1 to 5 of Table 1, and kneaded by a three roll mill, thereby producing photosensitive dielectric pastes. Table 1 shows proportions of inorganic ingredients constituting the photosensitive dielectric pastes.

Moreover, photosensitive dielectric pastes of Samples Nos. 6 to 8 (samples within the scope of the invention) were produced by partially replacing the dielectric powder by quartz powder.

TABLE 1

|  |  | Sample No. (Examples) | | | | | | | |
|---|---|---|---|---|---|---|---|---|---|
|  |  | 1 | 2 | 3 | 4 | 5 | 6 | 7 | 8 |
| Inorganic ingredient (vol %) | Dielectric powder (Ba—Nd—Ti complex oxide) | 20 | 20 | 19 | 10 | 30 | 10 | 5 | 15 |
|  | Sintering aid glass powder 1 (Bi—B—Si) | 10 | 5 | 1 | 10 | 20 | 10 | 10 | 20 |
|  | Sintering aid glass powder 2 (Li—Ca—B—Si) |  |  |  |  |  |  |  |  |

TABLE 1-continued

| | | Sample No. (Examples) | | | | | | | |
|---|---|---|---|---|---|---|---|---|---|
| | | 1 | 2 | 3 | 4 | 5 | 6 | 7 | 8 |
| | Supporting glass powder (Si—B—K) | 70 | 75 | 80 | 80 | 50 | 70 | 80 | 50 |
| | Quartz powder | | | | | | 10 | 5 | 15 |
| Evaluation results | Generation of Bi—Nd—Ti complex oxide | ○ | ○ | ○ | ○ | ○ | ○ | ○ | ○ |
| | Sintering properties | ○ | ○ | ○ | ○ | ○ | ○ | ○ | ○ |
| | Dielectric constant | 18 | 17 | 20 | 14 | 35 | 17 | 14 | 29 |
| | Tcc (−35 to 85° C.) [ppm/° C.] | 35 | 32 | 46 | 38 | 63 | 38 | 40 | 66 |
| | Dielectric breakdown voltage (30 μm) [kV] | 0.65 | 0.54 | 0.51 | 0.48 | 0.42 | 1.54 | 1.26 | 0.98 |
| | Resolution (Via hole diameter) [μm] | 40 | 40 | 40 | 40 | 50 | 40 | 40 | 50 |

The composition of the photosensitive organic ingredient (photosensitive varnish) constituting each photosensitive dielectric paste is as shown in Table 2.

TABLE 2

| Photosensitive organic ingredient | | Proportion (vol %) |
|---|---|---|
| Acrylic copolymer | Copolymer of methyl methacrylic acid and methacrylic acid | 39.9 |
| Monomer | EO-modified trimethylol propane acrylate | 27.3 |
| Photopolymerization initiator | 2-methyl-1-[4-(methylthio)phenyl]-2-morpholinoproane-1-one | 2.7 |
| | 2,4-diethyl thioxanthone | 0.9 |
| | Phenyl bis(2,4,6-trimethyl benzoyl)phosphine oxide | 1.4 |
| Additives | Disazo dye | 0.32 |
| | Castor oil sedimentation inhibitor | 0.08 |
| | Glucitol | 0.4 |
| | Defoaming agent | 0.9 |
| | Polymaleic acid dispersant | 0.6 |
| Solvent | Dipropylene glycol monomethyl ether | 25.5 |

Production of Evaluation Sample (Dielectric Film)

First, an Ag paste (conductive paste) was screen-printed onto a dielectric substrate to form an electrode pattern, and then burned at 840° C. under atmospheric air.

Then, the photosensitive dielectric pastes of Samples Nos. 1 to 8 produced as described above (i.e., photosensitive dielectric paste of Examples satisfying the requirements of the invention) were screen-printed, and dried. Thereafter, the pastes were exposed, developed, and burned at 840° C. under atmospheric air, thereby dielectric films as evaluation samples.

Evaluation of Properties

The evaluation samples produced as described above were evaluated for (1) Generation of Ba—Nd—Ti complex oxide, (2) Sintering properties, (3) Dielectric constant, (4) Temperature characteristics: Tcc (−35 to 85° C.) [ppm/° C.], (5) Dielectric breakdown voltage (30 μm) [kV], and (6) Resolution (via hole diameter) [μm] by the following method. The resolution was evaluated by separately producing another evaluation sample as described later.

Evaluation Method (1) Generation of Bi—Nd—Ti Complex Oxide

It was confirmed whether or not the Bi—Nd—Ti complex oxide was generated as follows. The photosensitive dielectric paste was applied to a ceramic substrate, dried, and burned. Only the film was scraped, and then crushed. Then, it was analyzed using a powder X-ray diffractometer (XRD) whether or not the Bi—Nd—Ti complex oxide was generated.

(2) Sintering Properties

The sintering properties were evaluated by observing the surface and the cross section of the film after burning with a scanning electron microscope (SEM).

(3) Dielectric Constant

The dielectric constant of the samples produced as described above was measured with an LCR meter, and the dielectric constant was calculated from the film thickness of an insulating layer and the electrode area.

(4) Temperature Characteristics: TCC (−35 to 85° C.) [ppm/° C.]

Changes in capacity in a temperature range of −55° C. to 135° C. were measured with a TCC evaluation system, and then the changes in capacity relative to the capacity at a reference temperature of 20° C. were calculated. Table 1 shows temperature characteristics in a temperature range of −35 to 85° C.

(5) Dielectric Breakdown Voltage (30 μm) [kV]

The voltage resistance was evaluated by measuring the dielectric breakdown voltage (BDV) [kV].

(6) Resolution (Via Hole Diameter) [μm]

The resolution was evaluated as the method described below.

Separately from the samples produced in Examples above, a coating film having a thickness of 20 to 30 μm was obtained by applying the photosensitive dielectric paste of the Example to the ceramic substrate by screen printing, and drying at 90° C. for about 5 minutes.

Then, UV light of 50 to 3000 mJ/cm$^2$ was emitted through a photomask having a via hole pattern.

Here, an exposure to light by a soft contact mode in which the coating film and the photomask were brought into contact with each other was performed. For a UV light source, an ultrahigh pressure mercury lamp was used.

After exposure to light, shower development was performed using a 0.5% by weight aqueous sodium carbonate solution as a developing liquid and using water as a rinsing liquid to thereby remove the uncured portion and form a via hole. The formed conductor pattern was observed, and then the via hole diameter was measured using a laser microscope, thereby evaluating the resolution.

The evaluation results of each of the properties are shown together in Table 1.

For comparison, as illustrated in Table 3, photosensitive dielectric pastes (Comparative Examples 1 to 10) that do not satisfy the requirements of the invention in terms of the composition or components, and the properties thereof were evaluated by the same method as those of each sample of Examples above. The results are shown together in Table 3.

In Comparative Example 6, in which the proportion of the dielectric powder is smaller and not within the scope of the invention, sintering is excessively performed.

Also in Comparative Example 5 in which the proportion of the supporting glass powder is higher and not within the scope of the invention, sintering is excessively performed.

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Inorganic ingredient (vol %) | Dielectric powder (Ba—Nd—Ti complex oxide) | 40 | 30 | 40 | 40 | 10 | 5 | 20 | 15 | 5 | 10 |
|  | Sintering aid glass powder 1 (Bi—B—Si) | 50 | 40 | 20 | 10 | 1 | 15 |  |  | 10 | 20 |
|  | Sintering aid glass powder 2 (Li—Ca—B—Si) |  |  |  |  |  |  | 10 | 5 |  |  |
|  | Supporting glass powder (Si—B—K) | 10 | 30 | 40 | 50 | 89 | 80 | 70 | 80 | 70 | 50 |
|  | Quartz powder |  |  |  |  |  |  |  |  | 15 | 20 |
| Evaluation results | Generation of Bi—Nd—Ti complex oxide | ○ | ○ | ○ | ○ | ○ | ○ | x | x | ○ | ○ |
|  | Sintering properties | x (insufficient sintering) | x (not holding shape) | x (insufficient sintering) | x (insufficient sintering) | x (excess sintering) | x (excess sintering) | ○ | ○ | x (insufficient sintering) | x (insufficient sintering) |
|  | Dielectric constant | — | — | — | — | — | — | 47 | 36 | — | — |
|  | Tcc (−35 to 85° C.) [ppm/° C.] | — | — | — | — | — | — | 321 | 228 | — | — |
|  | Dielectric breakdown voltage (30μ) [kV] | — | — | — | — | — | — | 0.24 | 0.31 | — | — |
|  | Resolution (Via hole diameter) [μm] | — | — | — | — | — | — | 50 | 40 | — | — |

The samples of Comparative Examples 1 to 6 of Table 3 are photosensitive dielectric pastes that contain the same ingredients but do not satisfy the requirements of the invention and the samples of Comparative Examples 7 and 8 are photosensitive dielectric pastes in which the sintering aid glass powder itself does not satisfy the requirements of the invention.

In Comparative Examples 7 and 8, Li—Ca—B—Si glass: ($SiO_2$; 47% by weight, $B_2O_3$; 17% by weight, CaO; 19% by weight, $Li_2O$; 13% by weight, ZnO; 4% by weight) and having a glass softening point of 718° C. are used as the sintering aid glass powder.

In the samples of Comparative Examples 9 and 10, the dielectric powder was partially replaced by quartz powder.

In the case of Samples Nos. 1 to 5 (samples of Examples) in Table 1, satisfying the requirements of the invention, favorable results are obtained for each of the evaluation criteria of (1) Generation of Bi—Nd—Ti complex oxide (2) Sintering properties (3) Dielectric constant (4) Temperature characteristics (5) Dielectric breakdown voltage, and (6) Resolution.

It was confirmed in Samples Nos. 6 to 8 in which the dielectric powder has been partially replaced by quartz powder that the dielectric breakdown voltage is higher than those of Samples Nos. 1 to 5, and favorable results are obtained.

In contrast, it is found that in the case of the samples of Comparative Examples 1 to 10, not satisfying the requirements of the invention, the results of some evaluation criteria are not favorable as shown in Table 3.

For example, sintering is insufficient in Comparative Examples 1, 3, and 4 in which the proportion of the dielectric powder is higher and not within the scope of the invention.

In Comparative Example 2 in which the proportion of the supporting glass powder is smaller and not within the scope of the invention, the film shape was not held.

In Comparative Example 7 and 8 in which Li—Ca—B—Si glass: ($SiO_2$; 47% by weight, $B_2O_3$; 17% by weight, CaO; 19% by weight, $Li_2O$; 13% by weight, ZnO; 4% by weight), which does not contain Bi and is a glass outside the scope of the invention, was used as the sintering aid glass powder, the sintering properties are favorable but, considering that the Bi—Nd—Ti complex oxide is not generated, the temperature characteristics: Tcc (−35 to 85° C.) are remarkably inferior to the samples of the invention and the dielectric breakdown voltage is also inferior thereto.

In the case of Comparative Examples 9 and 10 in which the dielectric powder was partially replaced by quartz powder, sintering became insufficient similarly as in the case of Comparative Examples 1, 3, and 4, and the properties were not evaluated.

Thus, it is found that, according to the photosensitive dielectric paste of the invention, dielectric films (insulator films) excellent in various properties, such as sintering properties or temperature characteristics, can be obtained as described above.

EXAMPLE 2

In Example 2, an electronic part (filter element) having a dielectric film (insulator film) formed using the photosensitive dielectric paste of the invention will be described.

Figure 1B:
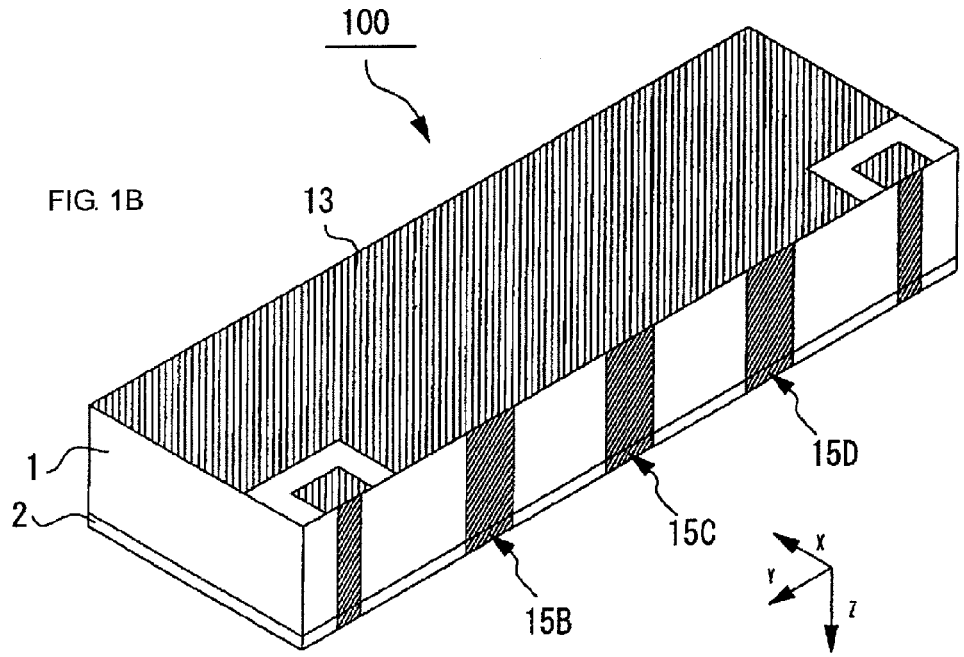
Figure 2:
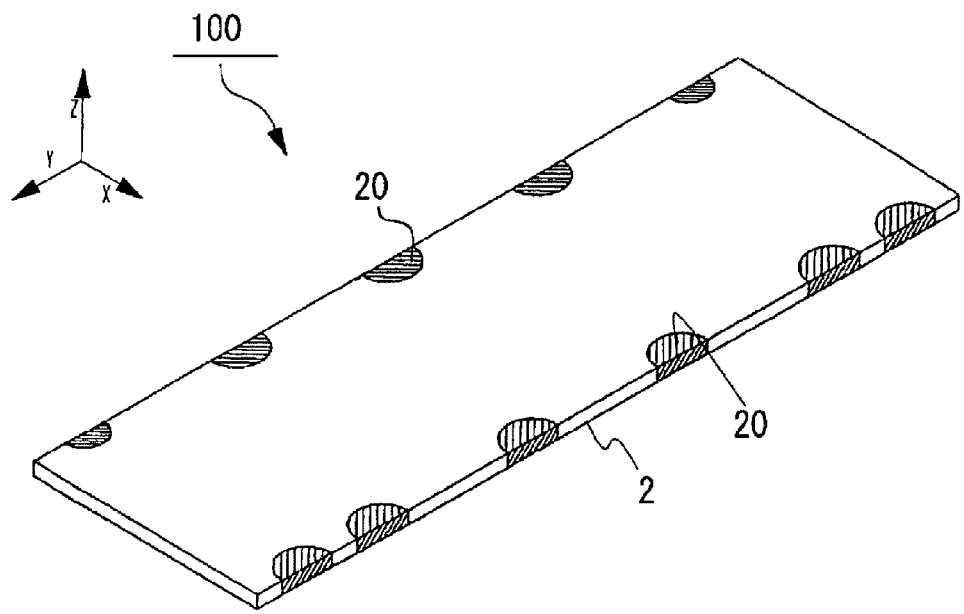
FIG. 2 is an exploded perspective view of the filter element of FIG. 1.
Figure 2:
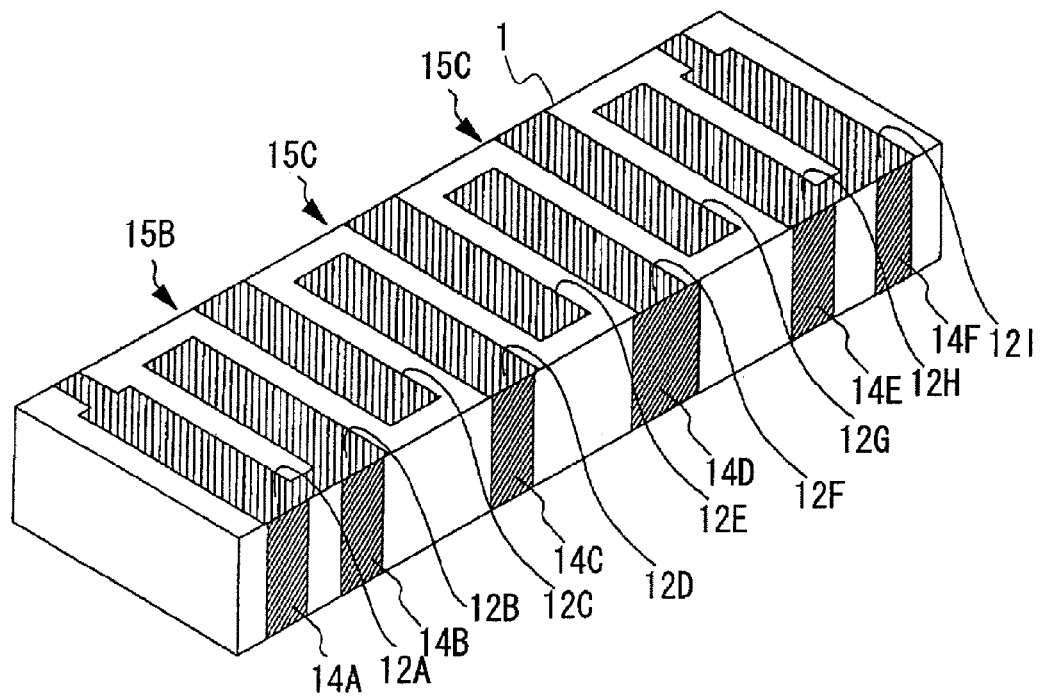

FIG. 1A is a perspective view illustrating the structure of a filter element according to Example 2 and FIG. 1B is a perspective view illustrating the filter element according to Example 2 viewed from the side opposite to FIG. 1A (rear side). FIG. 2 is an exploded perspective view thereof.

As illustrated in FIGS. 1A and 1B and FIG. 2, a filter element 100 of Example 2 has a plate-like dielectric substrate 1, a ground electrode 13 containing Ag provided at the rear side main surface of the dielectric substrate 1 (FIG. 1B), side surface resonant lines 14A to 14F, 15B, 15C, and 15D (FIG. 2) containing Ag formed on the side surface of the dielectric substrate 1 using the vicinity of the boundary between the side surface of the dielectric substrate 1 and the ground electrode 13 as a short-circuit end, and main surface resonant lines 12A to 12I containing Ag extending from the side surface resonant lines to the front side main surface. The resonant lines and the ground electrode 13 constitute a strip line resonator.

On the front side main surface of the dielectric substrate 1, a dielectric film (glass layer) 2 is formed, which is obtained by applying the photosensitive dielectric (glass) paste of Sample No. 1 in Example 1 to the entire surface, and sintering at 840° C. under atmospheric air. On the surface of the dielectric film (glass layer) 2, electrodes 20 electrically connected to the resonant lines are disposed.

The filter element 100 of Example 2 has, on the front side main surface, the dielectric film (glass film) 2 having a high dielectric constant and moreover excellent temperature characteristics formed using the photosensitive dielectric paste of the invention. Therefore, a filter that is smaller and has less deterioration of properties due to temperature changes than in former cases can be obtained.

Here, the description is given to the filter element as an example of an electronic part. However, the photosensitive dielectric paste of the invention can also be used when a dielectric film (insulator film) is formed on other electronic parts, such as, an LC composite element.

Moreover, when the photosensitive dielectric paste of the invention is used for production of an electronic part having a dielectric film (insulator film) requiring the formation of via holes using a photolithography technique, the photosensitive dielectric paste of the invention allows fine and highly precise processing, and thus is particularly significant.

The invention is not limited to Examples described above. The invention can be variously applied and modified within the scope of the invention in terms of specific compositions of inorganic ingredients and photosensitive organic ingredients constituting the photosensitive dielectric paste, proportions of both ingredients, types of electronic parts having a dielectric film (insulator film) formed using the photosensitive dielectric paste of the invention, and the like.

INDUSTRIAL APPLICABILITY

As described above, the use of the photosensitive dielectric paste of the invention allows the formation of a dielectric film (insulator film) that can be burned at a low temperature in a short time and has favorable properties, such as temperature characteristics of dielectric constant.

By providing the dielectric film (insulator film) formed using the photosensitive dielectric paste of the invention, in electronic parts, such as filter elements, electronic parts that are smaller and have less deterioration of properties due to temperature changes than in former cases can be provided.

Therefore, the invention can be widely applied to the field of photosensitive dielectric materials for the production of electronic parts and the field of electronic parts, such as filter elements having a dielectric film or LC composite components.

The invention claimed is:

1. A photosensitive dielectric paste comprising an inorganic ingredient and a photosensitive organic ingredient, wherein
    (a) the inorganic ingredient comprises 10 to 30% by volume of a Ba—Nd—Ti complex oxide dielectric powder, 50 to 80% by volume of supporting glass powder, and 1 to 20% by volume of sintering aid glass powder containing Bi; and
    (b) the Ba—Nd—Ti complex oxide powder reacts with the sintering aid glass powder upon burning to thereby produce a Bi—Nd—Ti complex oxide.

2. A photosensitive dielectric paste according to claim 1, wherein the inorganic ingredient contains at least one inorganic powder selected from the group consisting of quartz, alumina, mullite, and zirconia in a total proportion of 10 to 30% by volume; and
the inorganic powder is 50% by volume or less based on the total volume of the dielectric powder and the inorganic powder.

3. The photosensitive dielectric paste according to claim 2, wherein the sintering aid glass powder contains 50 to 90% of Bi in terms of $Bi_2O_3$.

4. The photosensitive dielectric paste according to claim 3, wherein the supporting glass powder contains Si in a proportion of 70 to 90% by weight in terms of $SiO_2$.

5. The photosensitive dielectric paste according to claim 3, wherein the supporting glass powder has a softening point which is lower by about 100 to 400° C. than the maximum burning temperature, and the sintering aid glass powder has a softening point which is lower than that of the supporting glass powder.

6. The photosensitive dielectric paste according to claim 5, wherein the supporting glass powder is a low alkali borosilicate glass that can be burned at about 800° C. to 900° C.

7. The photosensitive dielectric paste according to claim 1, wherein the sintering aid glass powder contains 50 to 90% of Bi in terms of $Bi_2O_3$.

8. The photosensitive dielectric paste according to claim 7, wherein the supporting glass powder contains Si in a proportion of 70 to 90% by weight in terms of $SiO_2$.

9. The photosensitive dielectric paste according to claim 1, wherein the supporting glass powder contains Si in a proportion of 70 to 90% by weight in terms of $SiO_2$.

10. The photosensitive dielectric paste according to claim 1, wherein the supporting glass powder has a softening point which is lower by about 100 to 400° C. than the maximum burning temperature, and the sintering aid glass powder has a softening point which is lower than that of the supporting glass powder.

11. The photosensitive dielectric paste according to claim 1, wherein the supporting glass powder is a low alkali borosilicate glass that can be burned at about 800° C. to 900° C.

12. An electronic part comprising a dielectric film which is a sintered photosensitive dielectric paste according to claim 1.

13. An electronic part comprising a dielectric film which is a sintered photosensitive dielectric paste according to claim 2.

14. An electronic part comprising a dielectric film which is a sintered photosensitive dielectric paste according to claim 3.

15. An electronic part comprising a dielectric film which is a sintered photosensitive dielectric paste according to claim 4.

16. An electronic part comprising a dielectric film which is a sintered photosensitive dielectric paste according to claim 5.

17. An electronic part comprising a dielectric film which is a sintered photosensitive dielectric paste according to claim 6.

18. An electronic part comprising a dielectric film which is a sintered photosensitive dielectric paste according to claim 7.

19. An electronic part comprising a dielectric film which is a sintered photosensitive dielectric paste according to claim 9.

\* \* \* \* \*